United States Patent [19]

MacKenna

[11] Patent Number: 5,612,634
[45] Date of Patent: Mar. 18, 1997

[54] CIRCUIT FOR SENSING WHETHER OR NOT AN ADD-IN BOARD IS INSERTED INTO A BUS CONNECTOR OF A MOTHER BOARD

[75] Inventor: Craig A. MacKenna, Los Gatos, Calif.

[73] Assignee: Zilog, Inc., Campbell, Calif.

[21] Appl. No.: 311,951

[22] Filed: Sep. 26, 1994

[51] Int. Cl.[6] .............................................. H03K 19/0175
[52] U.S. Cl. ............................ 326/62; 326/82; 235/441
[58] Field of Search .................................. 326/21, 62, 82, 326/86; 235/441; 439/59, 62

[56] References Cited

U.S. PATENT DOCUMENTS

| 4,675,769 | 6/1987 | Marshall et al. |  |
|---|---|---|---|
| 4,885,482 | 12/1989 | Sharp et al. | 326/47 |
| 4,948,954 | 8/1990 | Dias | 235/441 |
| 4,990,760 | 2/1991 | Tomari et al. | 235/441 |
| 5,162,675 | 11/1992 | Olsen et al. | 326/101 |
| 5,266,783 | 11/1993 | McAllister | 235/441 |

*Primary Examiner*—Edward P. Westin
*Assistant Examiner*—Jon Santamauro
*Attorney, Agent, or Firm*—Majestic, Parsons, Siebert & Hsue

[57] ABSTRACT

In an environment where a contact of a mother board is connected to a logic HIGH level voltage through a strong pull-up resistor, and a corresponding contact of an add-in board is connected to an open-drain driver, such that a control line driven by the open-drain driver is provided through the two contacts in normal mode operation when the two contacts make electrical connection, a circuit to sense whether or not the contact of the add-in board is making electrical connection with the contact of the mother board includes a weak pull-down resistor connected at one end to a node connecting the output of the open-drain driver to the contact of the add-in board, and connected at the other end to a ground reference. Accordingly, a voltage detected on the node is pulled up close to the logic HIGH level voltage if the contact of the add-in board is making electrical connection with the contact of the mother board and the open-drain driver is turned off, and is pulled down close to ground if the contact of the add-in board is not making electrical connection with the contact of the mother board and the open-drain driver is turned off. The voltage thus detected is provided to other circuitry on the add-in board, and/or back to a host computer on the mother board.

2 Claims, 4 Drawing Sheets

CIRCUIT FOR SENSING WHETHER OR NOT AN ADD-IN BOARD IS INSERTED INTO A BUS CONNECTOR OF A MOTHER BOARD

BACKGROUND OF THE INVENTION

This invention relates in general to computer systems having a mother board with one or more bus connectors for receiving one or more add-in boards and in particular, to a circuit for electronically sensing whether or not an add-in board is inserted into a bus connector of the mother board.

FIG. 1 illustrates, as an example, a mother board 10 having a plurality of integrated circuits, 14-1 to 14-3, for performing certain functionality of the mother board 10, and two slots, 11 and 12, for optionally receiving add-in boards which serve to expand the functionality of the mother board 10. So as to be compatible with the ISA or AT bus used in personal computers, each slot may have either one or two connectors, wherein one connector (e.g., 15 and 17) includes all of the signals needed for transferring 8 bits of data at a time between a host computer on the mother board 10 and an add-in board inserted into the connector, and the second connector (e.g., 16), if provided, includes those additional signals needed for transferring 16 bits of data at a time.

FIGS. 2 and 3 respectively illustrate, as examples, a first add-in board 20 having a plurality of integrated circuits, 26-1 to 26-3, for performing certain expanded functionality, and a second add-in board 30 also having a plurality of integrated circuits, 36-1 to 36-3, for performing other expanded functionality. To make electrical contact with the mother board 10, the first add-in board 20 also includes two connectors, 22 and 24, adapted to be inserted into either slot 11 or 12 of the mother board 10, and the second add-in board 30 includes one connector 32 adapted to be inserted into either slot 11 or 12 of the mother board 10. In particular, connectors 22 and 24 of the first add-in board 20 are adapted to be respectively inserted into connectors 15 and 16 of the mother board 10 when the first add-in board 20 is inserted into slot 11, and connectors 22 and 32, respectively of the first add-in board 20 and the second add-in board 30, are adapted to be inserted into connector 17 of the mother board 10 when either the first add-in board 20 or the second add-in board 30 is inserted into slot 12. The second add-in board 30 also includes an RS-232 connector 34 adapted to be connected to a serial port (not shown) on the mother board 10.

FIG. 4 illustrates, as an example, a block diagram of a computer system wherein the first add-in board 20 is inserted into slot 11 of the mother board 10, and the second add-in board 30 is inserted into slot 12 of the mother board 10. In particular, with the add-in boards, 20 and 30, so inserted, a host computer 40 on the mother board 10 communicates with the second add-in board 30 via an 8-bit bus 42, and communicates with the first add-in board 20 via a 16-bit bus 44, wherein the 8-bit bus 42 includes signals transmitted through connector 17 and the 16-bit bus 44 includes signals transmitted through connectors 15 and 16 as previously described, for example, with reference to the ISA or AT bus used in personal computers.

FIG. 5 illustrates, as an example, a bus structure 400 typical of the 8-bit bus 42 and 16-bit bus 44. In particular, the bus structure 400 includes a plurality of data lines 52 (also referred to herein as a "data bus") and a plurality of address lines 54 (also referred to herein as an "address bus"), which may be separate or combined by conventional multiplexing techniques. For an 8-bit bus, such as the 8-bit bus 42, the bus structure 400 would have 8 data lines, and for an 16-bit bus, such as the 16-bit bus 44, the bus structure 400 would have 16 data lines. Also included in the bus structure 400 are a plurality of control lines 50, one or more ground lines 46, and one or more power lines 48.

When the first add-in board 20 is inserted into slot 12 of the mother board 10, the second connector 24 of the add-in board 20 is left "hanging in air" while the first connector 22 of the add-in board 20 is inserted into the single connector 17 of slot 12. If the add-in board 20 is of a type requiring connection to a 16-bit bus, then it should be pulled out of slot 12 and reinserted into a 16-bit slot, such as slot 11. On the other hand, if the add-in board 20 is of a type which can operate in either 8-bit or 16-bit mode, then it may be desirable for the add-in board 20 to automatically configure its operating mode to conform to the type of slot it has been inserted into and ignore or block the unconnected (i.e., "hanging") signals so that they do not interfere with the operation of the add-in board 20. In either case, it is useful for the add-in board 20 to be able to automatically determine, as soon as possible after reset or system start up, for examples, whether it has been inserted into an 8-bit or a 16-bit slot.

It is also desirable at times for the second add-in board 30 to determine whether or not it has been inserted into a slot of the mother board 10, as opposed to being connected to a power supply and used in a stand-alone manner. For example, the add-in board 30 may function as either an internal or external modem depending upon whether or not it has been inserted into a slot, such as slot 11 or 12, of the mother board 10. In particular, when the add-in board 30 is inserted into slot 12, it functions as an internal modem by communicating data through connector 17, and when the add-in board 30 is not inserted into slot 12, it acts as an external modem by communicating data through its RS-232 connector 34. Accordingly, it may also be desirable for the add-in board 30 to automatically determine, as soon as possible after reset or system start up, for examples, whether it has been inserted into a slot of the mother board 10.

FIG. 6 is useful for illustrating a prior art technique for determining whether or not an add-in board is inserted into a bus connector of a mother board. In the technique, one of the ground lines (e.g., 46-1 of the ground lines 46) from the mother board is used for determining whether or not the add-in board is inserted into the bus connector of the mother board. A drawback of the technique is that the ground line used for such determination is no longer available as a ground line to the add-in board (although it continues to function as a ground line for other add-in boards connected to it).

The ground line (e.g., 46-1) is connected from the mother board through a pin or contact 27 of its bus connector (e.g., slot 11 or 12) to the add-in board through an opposing pin or contact 57 of a mating connector of the add-in board. On the add-in board, a pull-up resistor 56 is connected at one end to the pin or contact 57 of the add-in board at node 58, and at another end to a voltage, such as a logic level voltage of 5 volts. A voltage detection circuit 60 detects the voltage V on the node 58, and generates a control signal 61 indicative of the detected voltage. If the add-in board is inserted into the bus connector of the mother board, then opposing pins or contacts, 57 and 27, respectively of the add-in board and the mother board, come together making electrical contact. As a result, the voltage V at node 58 is pulled down close to ground "gnd", and the detection circuit 60 generates a corresponding control signal 61, such as, for example, a logic level LOW signal. On the other hand, if the add-in board is not inserted into the bus connector of the mother board, then opposing pins or contacts, 57 and 27, respectively of the add-in board and the mother board, do not come together to make electrical contact. As a result, the voltage V at node 58 is pulled up through resistor 56 close to the logic level voltage of 5 volts, and the detection circuit 60 generates a corresponding control signal 61, such as, for example, a logic level HIGH signal.

As previously mentioned, one problem with such a prior art technique for electronically detecting whether or not an add-in board is inserted into a bus connector of a mother board, is that at least one of the ground lines of the mother board must be dedicated with respect to the add-in board for such detection and as a result, is not available for use as a ground line by the add-in board. For high performance applications, this reduction in the number of ground lines can be a significant disadvantage.

OBJECTS AND SUMMARY OF THE INVENTION

Accordingly, one object of the present invention is a circuit for electronically sensing or detecting whether or not two electronic module units are connected together at their respective contacts, without requiring the dedication of any of the two electronic module units' contacts for such sensing or detecting.

This and additional objects are accomplished by the various aspects of the present invention, wherein briefly stated, one aspect of the present invention is a sensing circuit for electronically sensing or detecting whether or not a first contact of a first electronic module unit is connected to a second contact of a second electronic module unit without requiring either the first or second contact to be dedicated for such sensing or detecting. In particular, the first contact in this aspect of the present invention, remains useful for transmitting signals from the first electronic module unit to the second electronic module unit, and the second contact remains useful for receiving the transmitted signals from the first electronic module unit during normal operation of the first and second electronic module units.

The sensing circuit is operative in an environment wherein at least one control signal is generated by turning on and off an open-drain driver connected through the first and second contacts to one end of a pull-up resistor connected at its other end to a logic level voltage on the second electronic module unit. Thus, when the first and second contacts are connected together and the open-drain driver is turned off, the control signal is pulled up to the logic level voltage by the pull-up resistor, and when the open-drain driver is turned on, the control signal is driven to ground through the open-drain driver.

The sensing circuit comprises a pull-down resistor connected between the first contact and a ground reference voltage, and means for detecting a voltage at the connection between the pull-down resistor and the first contact. Thus, when the first and second contacts are connected together, the pull-up resistor on the second electronic module unit and the pull-down resistor on the first electronic module unit form a voltage divider circuit between the logic level voltage on the second electronic module unit and the ground reference on the first electronic module unit. The resistance of the pull-down resistor is much larger than the resistance of the pull-up resistor so that when the first and second contacts are electrically connected together, a voltage at the connection between the pull-up and pull-down resistors is substantially equal to the logic level voltage. Hence, the pull-down resistor is termed "weak", because when the first and second contacts are electrically connected together, the pull-up resistor overpowers it and the voltage at the connection between the pull-up and pull-down resistors is pulled up towards the logic level voltage.

The weak pull-down resistor provides a means for sensing whether or not the first and second contacts are electrically connected together. Assuming that the open-drain driver is turned off at system start up or reset, the voltage at the connection between the weak pull-down resistor and the first contact is indicative of whether or not the first and second contacts are electrically connected together. If the first and second contacts are electrically connected together, then the pull-up resistor on the second electronic module unit overpowers the weak pull-down resistor on the first electronic module unit, and pulls the voltage up towards the logic level voltage. If the first and second contacts are not electrically connected together, then the weak pull-down resistor pulls the voltage down towards the ground reference.

The addition of the weak pull-down resistor does not disturb the normal function of the control signal when the first and second contacts are electrically connected together. When the open-drain driver is turned off, the pull-up resistor on the second electronic module unit overpowers the weak pull-down resistor on the first electronic module unit, pulling the control signal up to the logic level voltage. When the open-drain driver is turned on, the control signal is pulled down to the ground reference voltage through the open-drain driver.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

In the following description, the mother board and the add-in boards are also generically referred herein as electronic module units, because each of these boards is integrated into a unit carrying electronic modules (i.e., integrated circuits). When an add-in board is referred to herein as being inserted into a bus connector of a mother board, it is to be understood that this means that one or more connectors of the add-in board are mated to one or more corresponding connectors of the mother board so as to permit the transmission of electrical signals through corresponding contacts of the mated connectors. Where identical reference numbers are used for blocks or components in the figures, similarly constructed and functioning blocks or components are understood to be incorporated therein.

Figure 1:
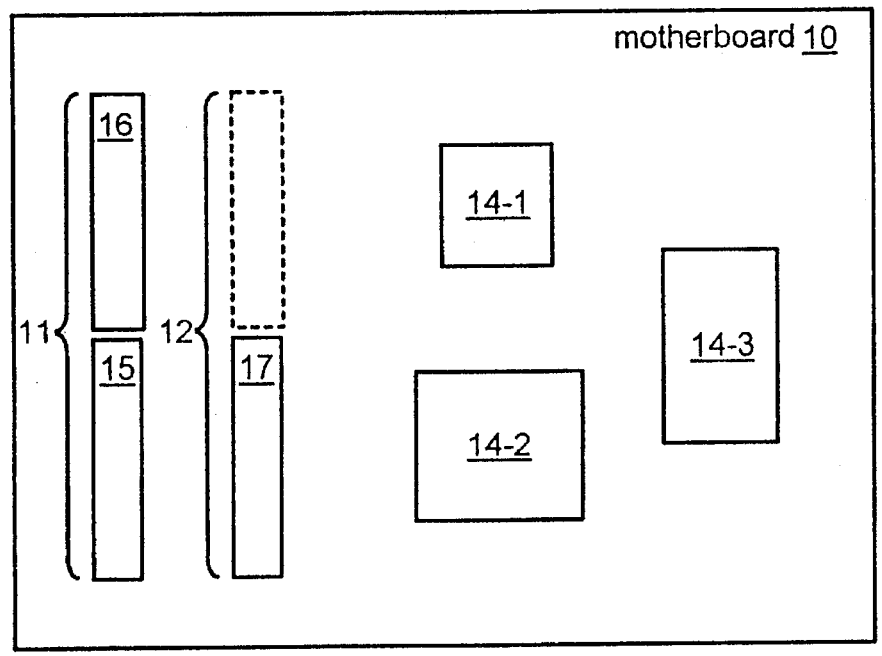
FIG. 1 illustrates, as an example, a top plan view of a mother board including two slots adapted for receiving add-in boards.
Figure 2:
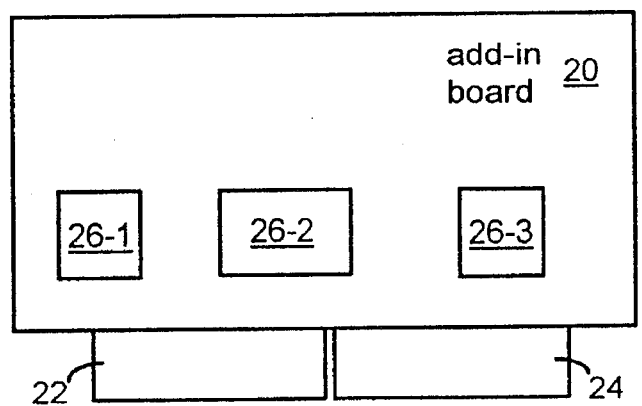
FIG. 2 illustrates, as an example, an elevational view of a first type of add-in board having a dual connector structure adapted for insertion into a slot of a mother board.
Figure 7:
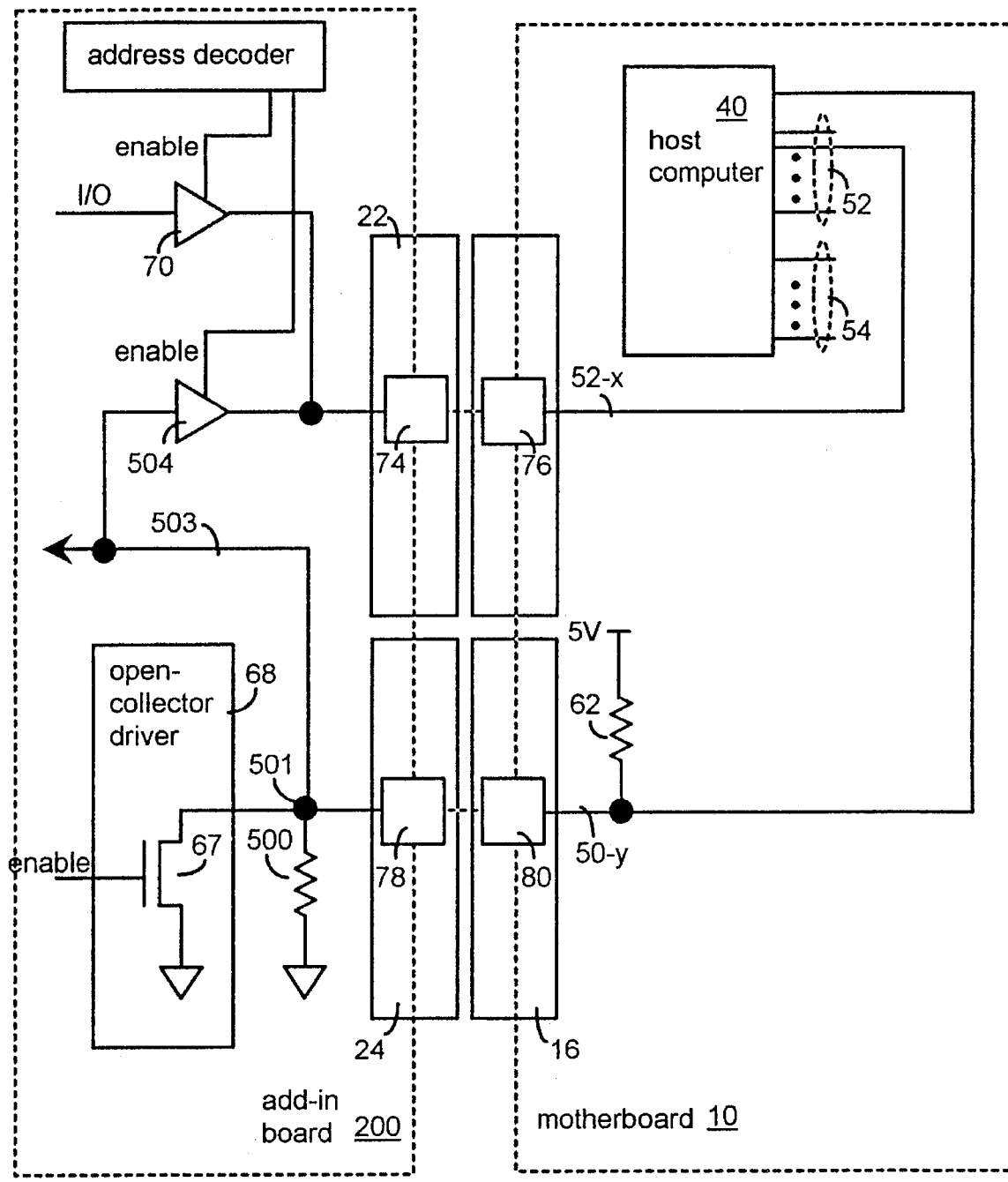
FIG. 7 illustrates, as an example, a first embodiment of a sensing circuit utilizing aspects of the present invention.

FIG. 7 illustrates, as an example, a first embodiment of the present invention. An add-in board 200, similarly constructed to the add-in board 20 of FIG. 2 (except for certain sensing circuitry utilizing aspects of the present invention), is inserted into either slot 11 or 12 of the mother board 10. If the add-in board 200 is inserted in slot 11, then connectors 22 and 24 of the add-in board 200 are respectively inserted into (i.e., mated with) connectors 15 and 16 of slot 11, and if the add-in board 200 is inserted into slot 12, then connector 22 of the add-in board 200 is inserted into connector 17 of slot 12 and connector 24 of the add-in board 200 is left "hanging in air".

A control line 50-y is connected between the add-in board 200 and the mother board 10 when a contact 78 of the connector 24 of the add-in board 200 and a contact 80 of the connector 16 of the mother board 10 are connected together (i.e., when connector 24 is inserted into connector 16). The control line 50-y is driven by an open-drain driver 68 (also referred to herein as an open-collector driver) on the add-in board 200 in conjunction with a strong pull-up resistor 62 on the mother board 10. The pull-up resistor 62 is connected between a logic level voltage of 5 volts, for example, and the contact 80 of the mother board 10, and the open-drain driver 68 is connected to the contact 78 of the add-in board 200, such that when the open-drain driver 68 is turned off, a voltage at a node 501 is pulled up close to the logic level voltage by the pull-up resistor 62, and when the open-drain driver 68 is turned on, the voltage at node 501 is driven towards ground (or a low voltage level) through the open-drain driver 68.

In the present invention, a weak pull-down resistor 500 is connected between node 501 and a ground reference (or low voltage reference), which forms a voltage divider circuit with the strong pull-up resistor 62 of the mother board 10, when the contact 78 of the add-in board 200 makes electrical connection with the contact 80 of the mother board 10. The pull-down resistor 500 is termed weak, because its value is substantially larger than that of the pull-up resistor 62. In the preferred embodiment, for example, the pull-up resistor 62 has a resistance value of 300 Ω, and the pull-down resistor 500 has a resistance value of 22 KΩ (i.e., 22,000 Ω). Accordingly, when the contact 78 of the add-in board 200 is making electrical connection with the contact 80 of the mother board 10, the strong pull-up resistor 62 "overpowers" the weak pull-down resistor 500 and pulls the voltage on the node 501 up close to the logic level voltage, and when the contact 78 of the add-in board 200 is not making electrical connection with the contact 80 of the mother board 10, the weak pull-down resistor 500 pulls the voltage on node 501 down close to the ground reference (or low voltage reference).

The voltage on node 501 can then be provided to other circuitry (not shown) on the add-in board 200 via line 503, and/or driven back to a host computer 40 of the mother board 10 via a data line 52-x, so that such other circuitry (not shown) and/or the host computer 40 would know whether or not the add-in board 200 has been inserted into slot 11 or 12, for example, of the mother board 10. Preferably, data line 52-x is on the 8-bit data bus connected through connector 22 of the add-in board 200, because the 8-bit data bus is available regardless of whether the add-in board 200 is inserted into slot 11 or 12 of the mother board 10, whereas the higher order data lines of the 16-bit data bus connected through connector 24 of the add-in board 200 are only available if the add-in board 200 is inserted into slot 11 of the mother board 10.

The voltage at node 501 is driven by tri-state driver 504 back to the host computer 40 of the mother board 10 via data line 52-x, when the host computer 40 causes the tri-state driver 504 to be enabled by addressing the tri-state driver 504 via address lines 54. In particular, when contacts 78 and 80 are electrically connected together and the voltage on node 501 is pulled up towards the logic level voltage by the strong pull up resistor 62, the tri-state driver 504 is driven to a logic level HIGH when the host computer 40 enables the tri-state driver 504, and when the contacts 78 and 80 are not electrically connected together and the voltage on node 501 is pulled down towards ground by the weak pull-down resistor 500, the tri-state driver 504 is driven to a logic level LOW when the host computer 40 enables the tri-state driver 504.

During normal mode operation, a signal generated by other circuitry (not shown) on the add-in board 200 may be driven by tri-state driver 70 back to the host computer 40 of the mother board 10 via data line 52-x, when the host computer 40 causes the tri-state driver 70 to be enabled by addressing the tri-state driver 70 via address lines 54.

Both tri-state drivers 70 and 504 are connected to data line 52-x of the 8-bit or 16-bit data bus through connector 22 of the add-in board 200. If the function of control line 50-y ensures that it will not be driven LOW by any add-in board (e.g., by open-drain driver 68 of add-in board 200) when the host computer 40 of the mother board 10 reads the output of the tri-state driver 504, then the output of the tri-state driver 504 is indicative of whether the add-in board 200 has been inserted into either slot 11 or slot 12 of the mother board 10. If the add-in board 200 has been inserted into slot 11, then the output of the tri-state driver 504 will be a logic level HIGH. If the add-in board 200 has been inserted into slot 12, then the output of the tri-state driver 504 will be a logic level LOW. On the other hand, when the host computer 40 of the mother board 10 addresses the tri-state driver 70, it can read information provided by other circuitry (not shown) on the add-in board 200 while operating in normal mode operation.

Figure 3:
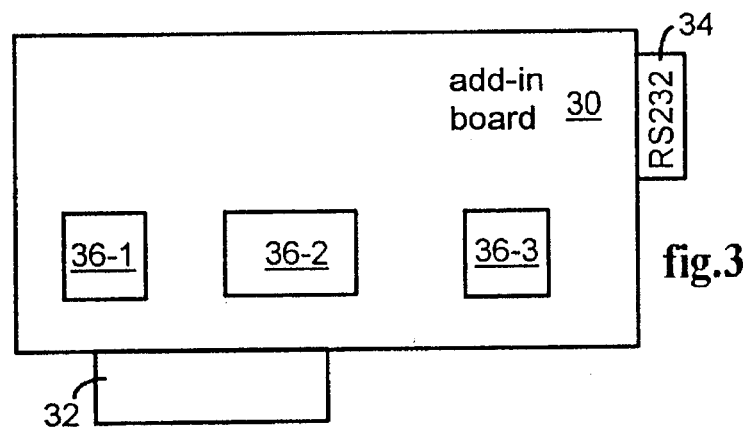
FIG. 3 illustrates, as an example, an elevational view of a second type of add-in board having a single connector structure adapted for insertion into a slot of a mother board.
Figure 4:
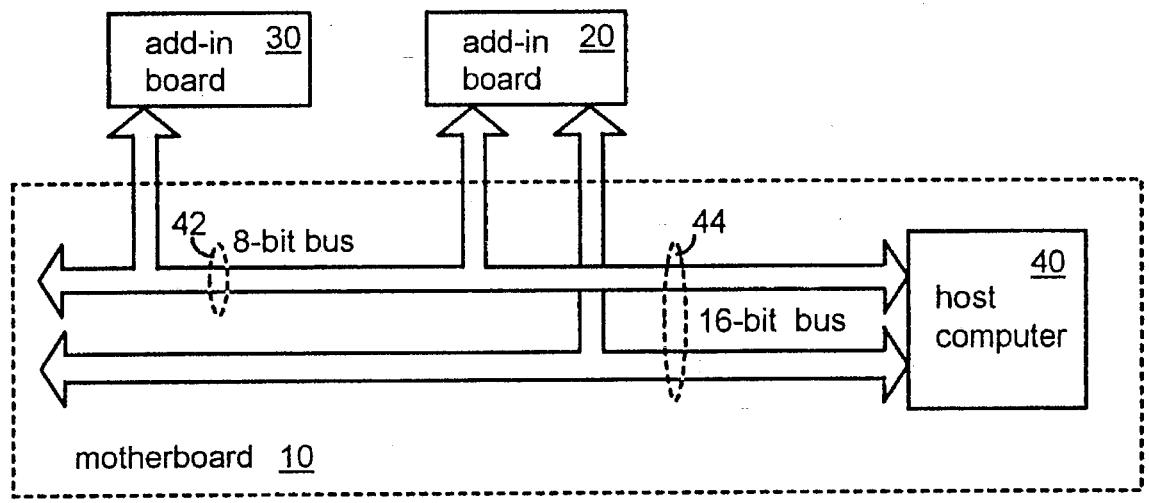
FIG. 4 illustrates, as an example, a system block diagram including the mother board, and the first and second types of add-in boards.
Figure 5:
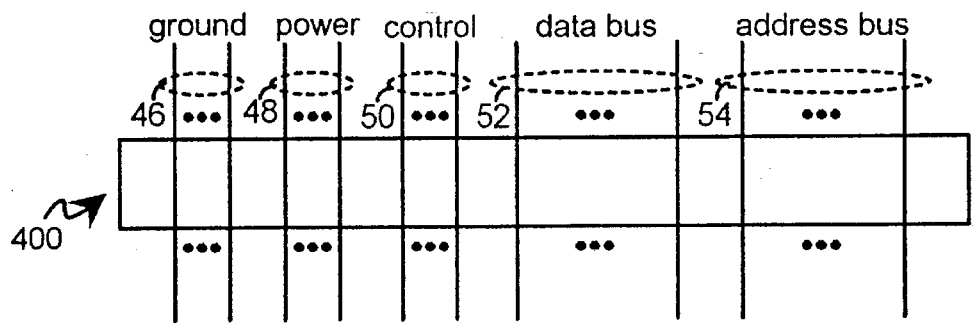
FIG. 5 illustrates, as an example, a typical bus structure.
Figure 6:
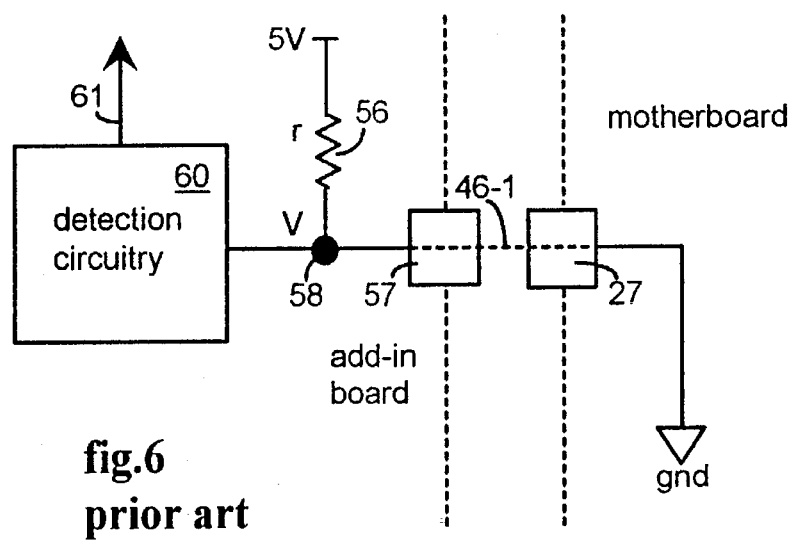
FIG. 6 illustrates a prior art circuit for sensing whether or not an add-in board has been inserted into a bus connector of a mother board.
Figure 8:
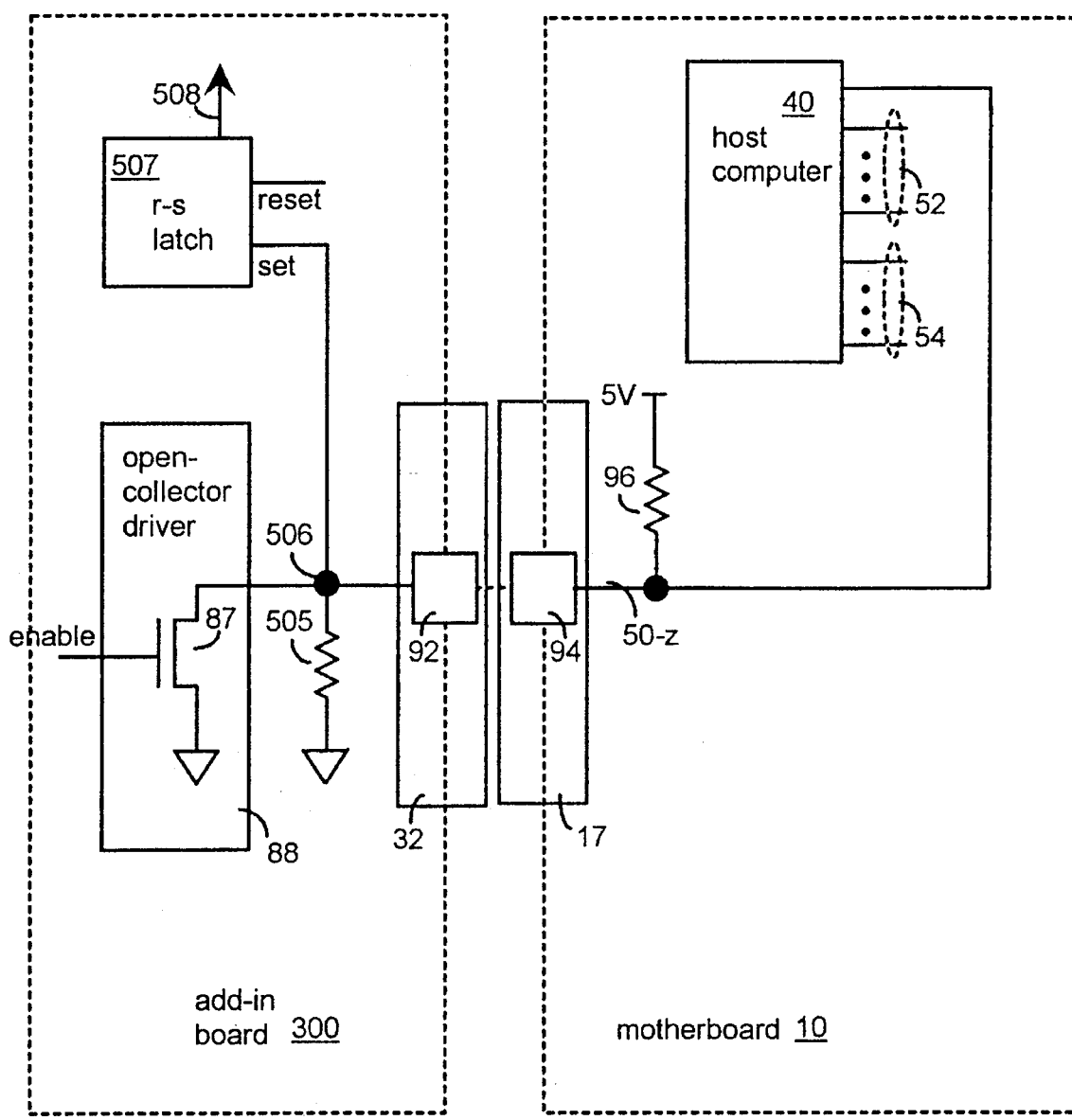
FIG. 8 illustrates, as an example, a second embodiment of a sensing circuit utilizing aspects of the present invention.

FIG. 8 illustrates, as an example, a second embodiment of the present invention. An add-in board 300, similarly constructed to the add-in board 30 of FIG. 3 (except for certain sensing circuitry utilizing aspects of the present invention), is either inserted into slot 12 of the mother board 10, or not inserted into any slot of the mother board 10 and connected to a power supply in a stand-alone manner instead. Accordingly, connector 32 of the add-in board 300 is either inserted into (i.e., mated with) connector 17 of slot 12, or is left "hanging in air," if it is not inserted into slot 12.

A control line 50-z known to be inactive/high at some time during normal mode operation, is connected between the add-in board 300 and the mother board 10 when a contact 92 of the connector 32 of the add-in board 300 and a contact 94 of either the connector 15 or 17 of the mother board 10 are connected together (i.e., when connector 24 is inserted into either slot 11 or 12 of the mother board 10). The control line 50-z is driven by an open-drain driver 88 on the add-in board 300 in conjunction with a strong pull-up resistor 96 on the mother board 10. The pull-up resistor 96 is connected between a logic level voltage of 5 volts, for example, and the contact 94 of the mother board 10, and the open-drain driver 88 is connected to the contact 92 of the add-in board 300, such that when the open-drain driver 88 is turned off, a voltage at node 506 is pulled up to the logic level voltage by the pull-up resistor 96, and when the open-drain driver 88 is turned on, the voltage at node 506 is driven to ground (or a low voltage level) through the open-drain driver 88.

In the present invention, a weak pull-down resistor 505 is connected between node 506 and a ground reference (or low voltage reference), which forms a voltage divider circuit with the strong pull-up resistor 96 of the mother board 10, when the contact 92 of the add-in board 300 makes electrical connection with the contact 94 of the mother board 10. The pull-down resistor 505 is termed weak, because its value is substantially larger than that of the pull-up resistor 96. In the preferred embodiment, for example, the pull-up resistor 96 has a resistance value of 300 $\Omega$, and the pull-down resistor 505 has a resistance value of 22 K$\Omega$ (i.e., 22,000 $\Omega$). Accordingly, when the contact 92 of the add-in board 300 is making electrical connection with the contact 94 of the mother board 10, the strong pull-up resistor 96 "overpowers" the weak pull-down resistor 505 and pulls a voltage on node 506 up close to the logic level voltage, and when the contact 92 of the add-in board 300 is not making electrical connection with the contact 94 of the mother board 10, the weak pull-down resistor 505 pulls the voltage on node 506 down close to the ground reference (or low voltage reference).

The voltage on node 506 can then be preserved by providing it to the high-active set input of an R-S latch 507, whose reset input is activated by a system reset so that the RS-latch 507 is reset at power up, for example. If the add-in board 300 is not inserted into slot 12 and the open-drain driver 88 is turned off, then the pull-down resistor 505 pulls node 506 down close to ground and the R-S latch 507 remains reset. If, however, the add-in board 300 is inserted into slot 12 of the mother board 10 and the open-drain driver 88 (and any other drivers on any other add-in boards connected to control line 50-z) is turned off, then the pull-up resistor 96 will pull node 506 up close to the logic HIGH level voltage and as a result, the R-S latch 507 is set. Thereafter, whenever a circuit (not shown) on the add-in board 300 needs to know whether or not the add-in board 300 has been inserted into slot 12 of the mother board 10, the circuit (not shown) can check the contents of the R-S latch 507 by enabling its output 508.

Although the various aspects of the present invention have been described with respect to a preferred embodiment, it will be understood that the invention is entitled to full protection within the full scope of the appended claims.

What is claimed is:

1. A sensing circuit for sensing whether or not a first contact of a first electronic module unit is electrically connected to a second contact of a second electronic module unit, wherein said first electronic module unit includes an open-drain driver connected to said first contact, and said second electronic module unit includes a pull-up resistor connected between said second contact and a logic level voltage, such that when said first and second contacts are electrically connected, a voltage on the connection of said first and second contacts is pulled up close to said logic level voltage when said open-drain driver is turned off, and pulled down to a ground reference voltage when said open-drain driver is turned on, said sensing circuit comprising:

a pull-down resistor connected between said first contact and a ground reference voltage, wherein said pull-down resistor has a resistance value greater than a resistance value of said pull-up resistor of said second electronic module, such that, when said first and second contacts are electrically connected and said open-drain driver is turned off, a voltage on a node defined at the connection between said pull-down resistor and said first contact is substantially pulled up to said logic level voltage, and when said first and second contacts are not electrically connected and said open-drain driver is turned off, said voltage on said node is substantially pulled down to said ground reference voltage; and means for communicating a logic level indicative of said voltage on said node defined at the connection between said pull-down resistor and said first contact, said communicating means including an addressable tri-state driver having an input connected to said node defined at the connection between said pull-down resistor and said first contact, and an output indicative of a voltage on said node defined at the connection between said pull-up resistor and said first contact, wherein said first electronic module unit has a third contact connected to said output of said addressable tri-state driver, and said second electronic module unit has a fourth contact electrically connected to said third contact of said first electronic module unit, such that a host computer on said second electronic module unit enables said addressable tri-state driver after addressing said addressable tri-state driver.

2. A sensing circuit for sensing whether or not a first contact of a first electronic module unit is electrically connected to a second contact of a second electronic module unit, wherein said second electronic module unit includes a pull-up resistor connected between said second contact and a logic HIGH voltage, said sensing circuit comprising:

a pull-down resistor connected between said first contact and a ground reference voltage, wherein said pull-down resistor has a resistance value greater than a resistance value of said pull-up resistor of said second electronic module unit, such that, when said first and second contacts are electrically connected, a voltage on a node defined at the connection between said pull-down resistor add said first contact is substantially pulled up to said logic HIGH voltage, and when said first and second contacts are not electrically connected, said voltage on said node is substantially pulled down to said ground reference voltage; and means for communicating to a circuit on said first electronic module unit, a logic level indicative of said voltage on said node defined at the connection between said pull-down resistor and said first contact, wherein said communicating means includes a R-S latch having a high-active set input connected to said voltage on said node defined at the connection between said pull-down resistor and said first contact, a reset input connected to a reset signal, and an output indicative of whether or not said first contact of said first electronic module unit is electrically connected to said second contact of said second electronic module unit.

* * * * *

UNITED STATES PATENT AND TRADEMARK OFFICE
CERTIFICATE OF CORRECTION

PATENT NO. : 5,612,634
DATED : March 18, 1997
INVENTOR(S) : Craig A. MacKenna

It is certified that error appears in the above-indentified patent and that said Letters Patent is hereby corrected as shown below:

In Column 8, line 46, Claim 2:
replace "resistor add said first contact is substantially pulled up to" with:

--resistor and said first contact is substantially pulled up to--

Signed and Sealed this

Third Day of February, 1998

Attest:

BRUCE LEHMAN

Attesting Officer

Commissioner of Patents and Trademarks